A. A. SMITH AND R. JORGENSEN.
ADJUSTABLE SEAT ATTACHMENT FOR AUTOMOBILES.
APPLICATION FILED JULY 6, 1920.
1,379,316. Patented May 24, 1921.
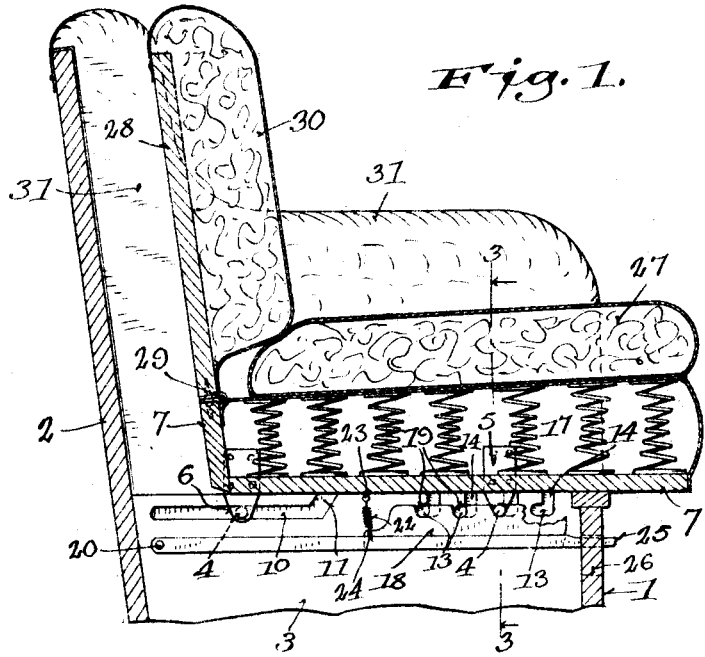
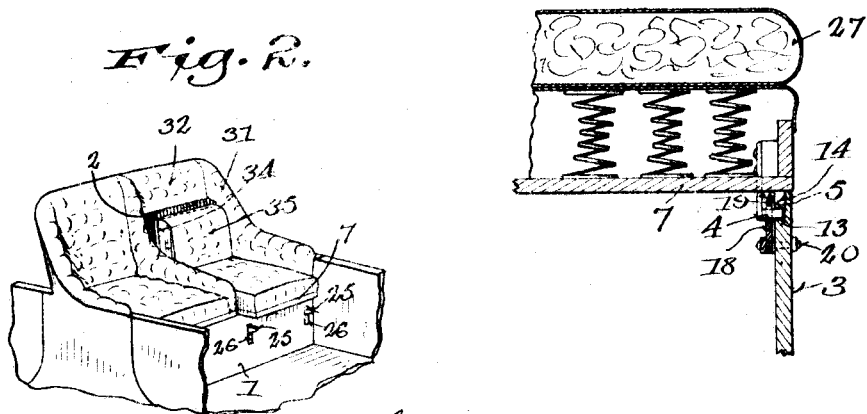

UNITED STATES PATENT OFFICE.

ALFORD A. SMITH AND RAY JORGENSEN, OF MILWAUKEE, WISCONSIN.

ADJUSTABLE SEAT ATTACHMENT FOR AUTOMOBILES.

1,379,316.     Specification of Letters Patent.     Patented May 24, 1921.

Application filed July 6, 1920. Serial No. 394,060.

*To all whom it may concern:*

Be it known that we, ALFORD A. SMITH and RAY JORGENSEN, citizens of the United States, residing at Milwaukee, county of Milwaukee, and State of Wisconsin, have invented new and useful Improvements in Adjustable Seat Attachments for Automobiles, of which the following is a specification.

Our invention relates to improvements in adjustable seat attachments for automobiles.

The object of our invention is to provide simple means for attaching an adjustable seat for the driver of an automobile to the main supporting seat, in such a manner that the adjustable seat can be moved forwardly and backwardly to suit the requirements of the driver, and securely locked in various positions of adjustment. Also to secure simplicity of structure and neatness of design, it being our purpose to provide a structure which can be so adjusted without impairing the neat and attractive appearance of the vehicle.

A further object of our invention is to provide means for so locking the adjustable seat in its various positions of adjustment, that it will not yield accidentally under any circumstances, the locking devices being so arranged as to prevent movement in any direction, and being of such simple structure that our improved attachment may be applied to an automobile with minimum expense.

The drawings show two embodiments of our invention.

Figure 1 shows our invention in vertical section, drawn to a plane extending longitudinally of the vehicle through the adjustable portion of the seat.

Fig. 2 is a perspective view showing our invention in its preferred form, the same locking mechanism being employed as in Fig. 1, and the modification consisting in the back of the permanent section, and the body portion of the adjustable section of the seat, whereby the latter may be formed with a short rigidly connected upholstered back.

Fig. 3 is a fragmentary sectional view, drawn on line 3—3 of Fig. 1.

Like parts are identified by the same reference characters throughout the several views.

The base 1 and back 2 may conform generally to the structure of the front seat of any ordinary automobile, except that in Fig. 1 the back 2 is preferably without upholstery on the driver's side, and in Fig. 2 the upholstery is omitted from the lower portion.

The risers or walls 3, (Fig. 3), are preferably special walls, extending across the base portion 1 from front to rear, and suitably notched along their upper margins to receive studs 4 carried by brackets 5 and 6 connected with the bottom 7 of the movable seat or seat section hereinafter described.

Each wall member or riser 3 has an elongated groove or slot 10 in its rear portion terminating at its front end in an upwardly extending portion 11 leading through the upper margin of the riser.

The forward portion of each riser 3 is provided with sets of similar grooves or slots 13 of shorter length in the horizontal dimension, and with the upwardly extending portions 14, preferably vertical. The horizontal portions 13 of these sets of grooves or slots may extend in either direction from the vertical portion, but are shown as extending rearwardly. The diameters of the connecting studs 4 are such as to allow them to slide freely in the slots or grooves, although they are preferably nearly equal in diameter to the width of the groove or grooves in which they may be respectively entered.

The grooves or slots 10 are of sufficient length back of the upwardly extending portions 11 to allow the studs 4, carried by the brackets 6, to travel along these grooves and remain in engagement therewith while the seat bottom 7 is being moved forwardly or backwardly to bring the studs 4, carried by the brackets 5, into registry with any one of the vertically extending grooves or slots 14, and to allow such studs to be entered in the registering grooves or slots 14, and moved backwardly in the horizontal grooves or slots 13 to positions underneath the overhanging marginal portions 17 of the risers, whereby the bottom of the seat portion 7 will be locked against vertical movement. Thereupon these studs 4 may be locked against horizontal movement by a latch 18 having notches 19,—one for each of said horizontal grooves 13,—and positioned for registry with the studs 4 when in their locked position therein.

The latches 18 are pivoted to the riser members or walls 3 at 20, and their notches are so located as to register only with those portions of the grooves or slots 13 over which the marginal portions 17 extend. These latches are therefore adapted, when in locking position, to prevent any movement of the studs 4 into registry with the vertical portions 14 of the grooves or slots. Coiled springs 22 are secured to the walls 3 at 23, and to the latches at 24, these springs being adapted to normally hold the latches in locking position. Each latch is provided with a forwardly projecting finger 25 extending through a slot 26 in the front wall of the base 1, whereby downward pressure may be applied by the thumb or finger to push the latch to releasing position.

It is not essential to our invention that more than one latch should be used, but we preferably provide one latch on each side, whereby both sides of the sliding seat bottom 7 may be securely locked.

The seat bottom 7 may be provided with an ordinary spring supported cushion 27. It is also provided with an auxiliary back, which, in Fig. 1, is illustrated as a back wall 28, hinged to the bottom portion 7 at 29, the hinge being adapted to allow the back wall 28 to swing forwardly from normal position while holding it against rearward movement from such position. This back wall 28 carries the upholstery 30, such as is ordinarily applied to the back wall 2. The wall 28 and its upholstery 30 are adapted to move forwardly along the end wall 31 of the seat adjacent to the portion occupied by the driver of the car.

In the construction shown in Fig. 2, the fixed back wall 2 of the seat has its upper portion covered with upholstery, as shown at 32, and the bottom portion 7 of the seat is provided with a short rigid back wall 34 covered with upholstery 35. This back wall 34 and its upholstery is virtually received in a recess bordered by the upholstery 32, and that which covers the end wall 31 of the seat when the adjustable portion is in its rearmost position.

It is not necessary to use the hinge 29 in this form of construction, for the reason that when the seat is drawn forwardly after releasing the latch, or latches, 18, and preparatory to lifting the front end out of the vertically extending slots or grooves 13, there will be sufficient clearance between the top of the back 34 and the permanently fixed back 2 to allow the front margin of the seat to be lifted until the lugs 4 on brackets 5 are withdrawn from the grooves 14. It will, of course, be understood that when the lugs have thus been withdrawn from the grooves 14, the seat may be again drawn forwardly until these lugs may be reëngaged in another set of grooves 14, moved downwardly into the grooves 13, and then rearwardly to a position which will allow the latch or latches 18 to engage the lugs, and lock them in the new position of adjustment. Preferably the arrangement is such that the lugs will in each position of adjustment engage the rear ends of the slots or grooves 13 with which they are associated, thereby relieving the latch or latches from strain, the latter serving only to prevent the seat from accidentally sliding forwardly to a position where the lugs might lift out of interlocking engagement with the risers 3.

We prefer the form of construction shown in Fig. 2, for the reason that when the adjustable seat or seat portion is moved forwardly, the opening between its back and the permanent back 2 will not ordinarily be exposed to view. In fact the first step in forward adjustment will not expose the opening at all where the upholstery is of ordinary thickness, and even in the next position of forward adjustment there will only be a short gap between the back 34 of the adjustable portion and the upholstery band or portion 32. In any case this gap or opening will not be visible to the occupants of the rear seat of the vehicle.

We claim:—

1. The combination with the main front seat of a motor driven vehicle, of an auxiliary seat adjustably mounted thereon, and adapted to be interlocked with the base portion of the main seat, a latch for holding the adjustable seat in such interlocked relation, the base portion of the main seat having risers provided with horizontal channels, and a vertical channel communicating with each horizontal channel at one end, the adjustable seat having depending brackets provided with lugs to engage in said channels by movement through the vertical portions thereof, and along the horizontal portions to interlocking position.

2. The combination with the main front seat of a motor driven vehicle, of a movable seat mounted upon one end portion of the main seat, and provided with depending brackets having laterally projecting lugs, the base portion of the main seat being provided with walls having channels in which said lugs may interlock in various positions of the adjustable seat, and a latch adapted to also engage said lugs in each position of adjustment to hold the same in interlocked position.

3. The combination with the main front seat of a motor driven vehicle, of a movable seat mounted upon one end portion of the main seat, and provided with depending brackets having laterally projecting lugs, the base portion of the main seat being provided with walls having channels in which said lugs may interlock in various positions of the adjustable seat, a latch adapted to also engage said lugs in each position of adjustment to hold the same in interlocked position, said adjustable seat portion having a short back, and the main seat having a recess in its back within which said short back may be received in one position of the adjustable seat.

4. The combination with a vehicle seat having a permanent back provided with a recess below its upper margin, an auxiliary seat adjustable forwardly and backwardly upon the main seat, and provided with a shorter back adapted to be received in said recess.

5. The combination with the main seat of a vehicle provided with upholstered ends and a raised upholstered back, the upholstery being omitted from the lower portion of the back near one end of the seat, an auxiliary seat mounted upon said end portion of the main seat, and provided with a cushion, said auxiliary seat having a short upholstered back adapted in one position of adjustment to enter the space from which the upholstery is omitted from the back of the main seat, and means for holding the auxiliary seat in various positions of forward and back adjustment.

6. The combination with a main front seat of a motor driven vehicle, of a movable seat mounted upon one end portion of the main seat and provided with depending brackets having laterally projected lugs, base portions connected with the main seat and extending longitudinally of the vehicle with channels therein, adapted to receive the lugs in inter-locked relation, and a latch having one end pivoted to the side of one of said walls and adapted to swing to a position of engagement with said lugs to hold them in inter-locked relation in the wall channels, and means for resiliently holding the latch in lug engaging position.

In testimony whereof we affix our signatures in the presence of two witnesses.

ALFORD A. SMITH.
RAY JORGENSEN.

Witnesses:
H. F. MAU,
Mrs. R. JORGENSEN.